United States Patent [19]

Hake et al.

[11] 4,321,971
[45] Mar. 30, 1982

[54] FIELD CULTIVATOR TOOL SUPPORT MOUNTING APPARATUS

[75] Inventors: Kenneth A. Hake; Nelson J. Palen, both of Tipton, Kans.

[73] Assignee: Kent Manufacturing Co., Inc., Tipton, Kans.

[21] Appl. No.: 87,016

[22] Filed: Oct. 22, 1979

[51] Int. Cl.³ .................... A01B 61/04; A01B 15/02
[52] U.S. Cl. ................................................ 172/710
[58] Field of Search .................... 172/705–710, 172/711, 763, 773, 775, 748; 29/509, 514, 150; 113/116 V, 116 HH

[56] References Cited

U.S. PATENT DOCUMENTS

| | | | |
|---|---|---|---|
| 3,084,749 | 4/1963 | Anderson | 172/268 |
| 3,098,529 | 7/1963 | Wade | 172/710 |
| 3,258,076 | 6/1966 | Groenke | 172/710 |
| 3,493,055 | 2/1970 | Van Peursem | 172/708 |
| 3,606,928 | 9/1971 | Quanbeck | 172/705 |
| 3,700,038 | 10/1972 | Essex | 172/705 |
| 3,700,039 | 10/1972 | Essex | 172/705 |
| 3,782,481 | 1/1974 | Quanbeck | 172/710 X |
| 4,143,718 | 3/1979 | Quanbeck | 172/705 |

OTHER PUBLICATIONS

Krause Field Cultivators for more Versatility in Tillage Operations, Krause Plow Corp-., Hutchinson, Kans.
Taylor Field Cultivators-Taylor Implement Mfg. Co., Athens, Tenn.
New Kent Heavy Duty Field Cultivators, 4000H Series 5000H, Kent Mfg. Co., Tipton, Kans.
New Generation of Kent Field Cultivators 6000 Series 7000 Kent Mfg. Co., Tipton, Kans.
Wil-Rich Mounted Coil Tooth Harrows for Field Cultivators & Chisel Plows, Wil-Rich Inc., Wapheton, N.D.
Bush Hog SOILHOG Advertizing Brochure of Allied Products Corp., Selma, Ala.

Primary Examiner—Richard J. Johnson
Attorney, Agent, or Firm—Fishburn, Gold and Litman

[57] ABSTRACT

A mounting apparatus for pivotally connecting a soil working tool to an agricultural tool bar. The mounting apparatus comprises a support bracket fastened to the tool bar by a U-bolt, a tool holding member which wraps around the tool and is pivotally connected at a medial point therealong to a lower end of the support bracket, and a biasing means connected to an upper end of the support bracket and pivotally attached by a connector member to the tool holder member at a position spaced from the connection of the support bracket and tool holder member. The support bracket is a one-piece channel shaped structure and comprises a web, side flanges, an upper connector lug for fastening same to the biasing means, pivotal means for allowing the tool holder member to rotate relative thereto, and stop means for limiting maximum rotation of the tool holder member. The support bracket attaches to the tool bar at cutouts on the outside edge of the flanges opposite the web thereby forming a strong rectangular structure therebetween. The support bracket is formed from a one-piece blank stamped from sheet metal stock.

7 Claims, 7 Drawing Figures

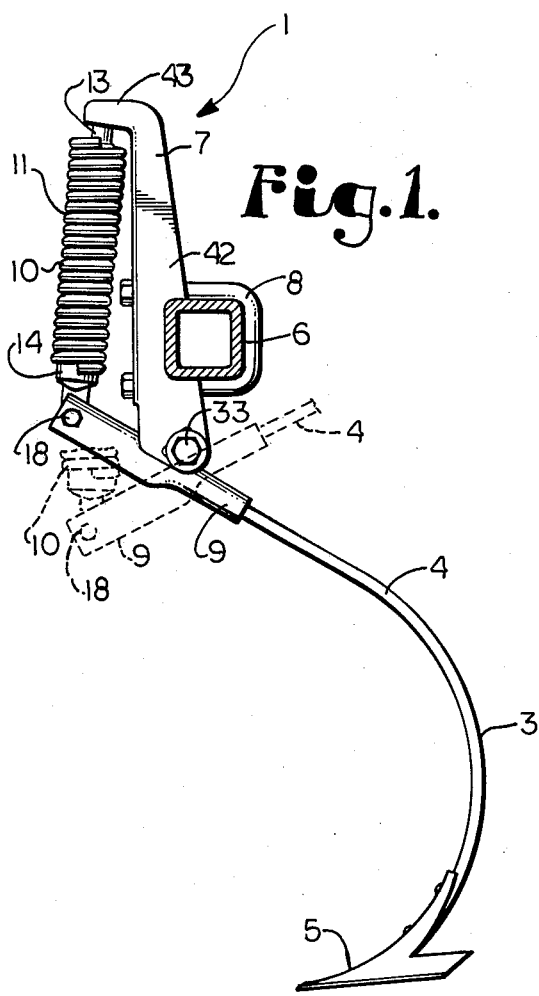
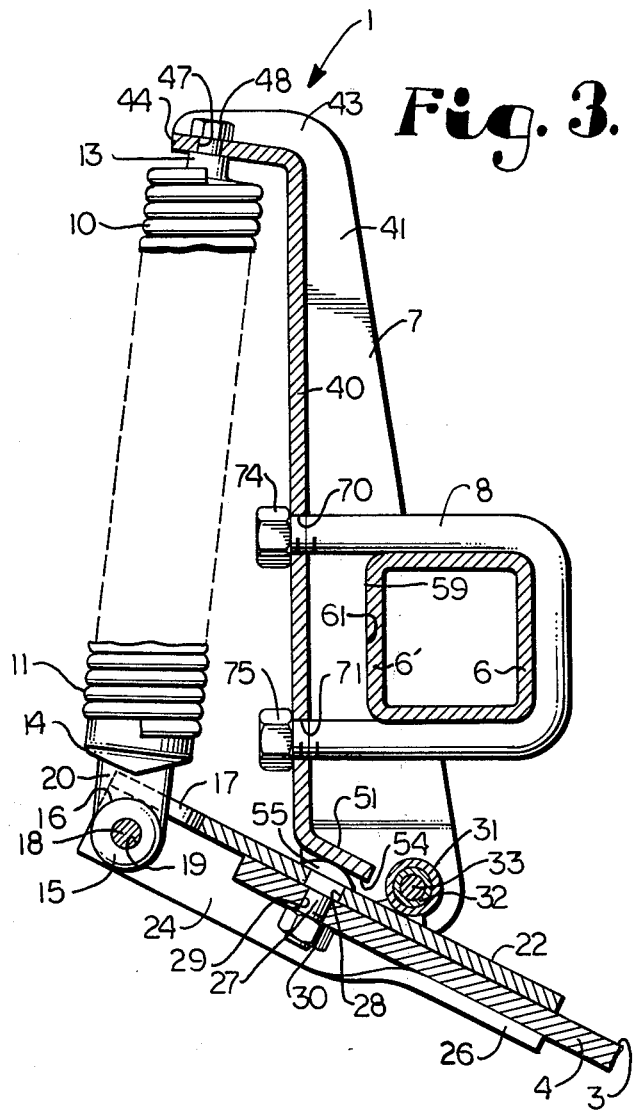
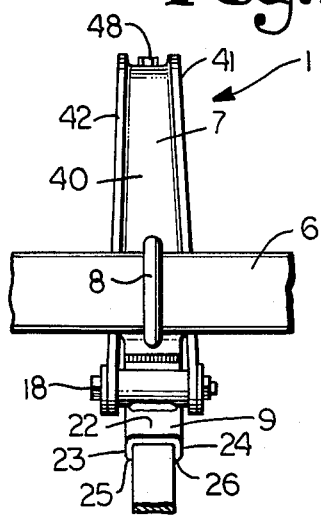
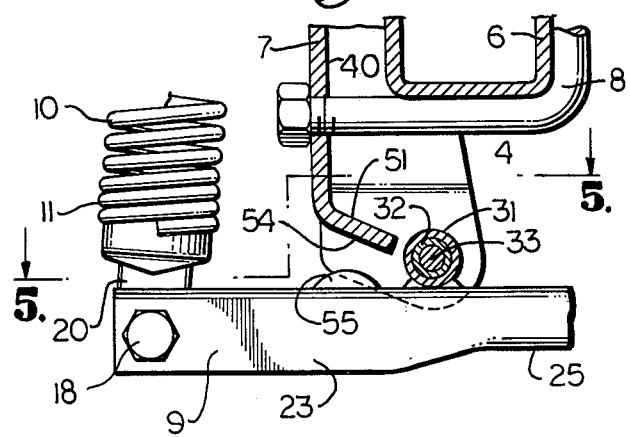

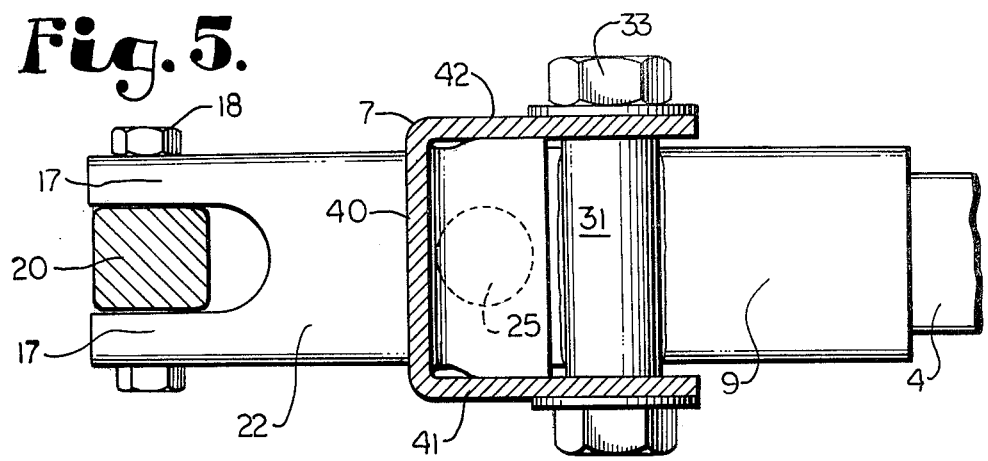
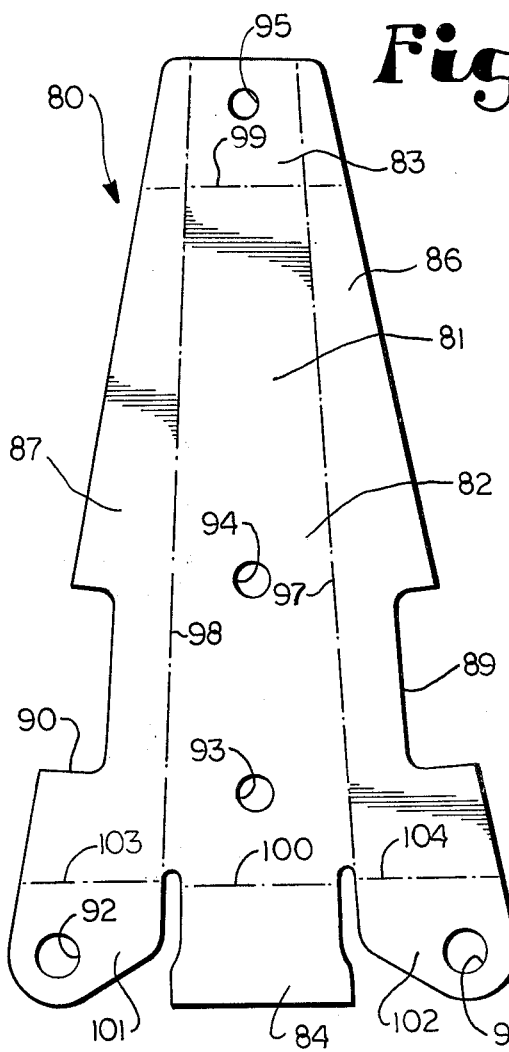
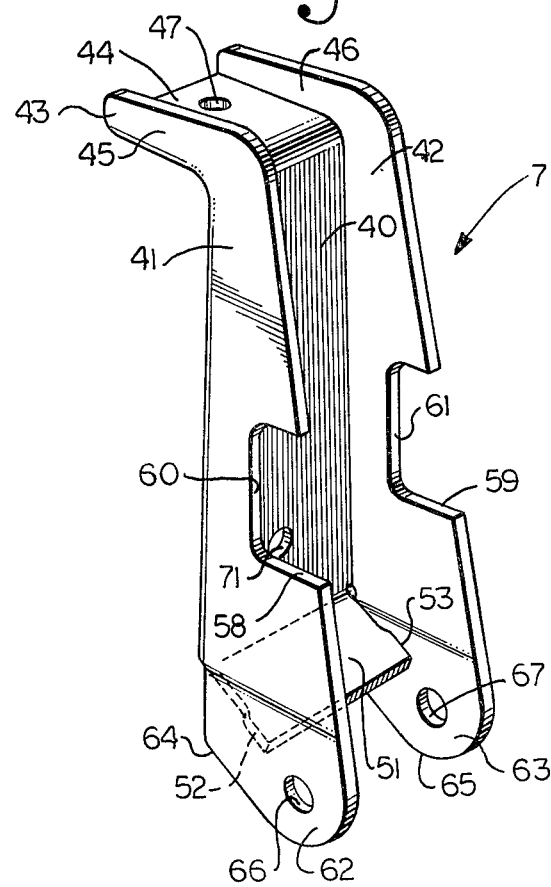

FIELD CULTIVATOR TOOL SUPPORT MOUNTING APPARATUS

BACKGROUND OF THE INVENTION

The present invention relates to devices for pivotally mounting agriculture tools on mobile farm equipment such that the tools are urged into the ground but can pivot upwardly to bypass immovable obstructions such as rocks.

Mounting devices for earth working tools are generally well-known; however, conventional devices have particular failings, especially with regard to strength versus relative size, ease of attaching and removing the devices from agricultural tool bars, economical and simple manufacture of such devices, and short life spans before repair or replacement is required. The present invention in conjunction with applicant's copending application Ser. No. 93,719 filed Nov. 13, 1979 entitled SPRING LOADED FIELD CULTIVATOR TOOL SUPPORT, now U.S. Pat. No. 4,281,719, is directed to improving such mounting devices to overcome the above mentioned problems.

OBJECTS OF THE INVENTION

Therefore, the principal objects of the present invention are: to provide an improved mounting apparatus for biased agricultural soil working tools; to provide such an apparatus which comprises a support bracket for clamping to a tool bar, a tool holder member pivotally connected to a lower end of the support bracket, and an extension spring attached to an upper end of the support bracket and to a free end of the tool holder member whereby the tool is urged into engagement with the soil at a predetermined level; to provide such a support bracket which is one-piece and easy to produce by sheet metal stamping and folding methods; to provide such a support bracket which forms a strong and stable attachment to the tool bar and is held thereto by only a single U-bolt; to provide such a support bracket which allows easy attachment to and disengagement from the tool bar with improved access to the fasteners thereof; to provide such a support bracket which forms a strong pivotal connection with the tool while remaining relatively light and small in size; to provide a blank and a method for producing such a support bracket from flat sheet metal stock; and to provide such a mounting apparatus which is capable of an extended useful life, is relatively inexpensive to produce, and is particularly well adapted for the proposed usage thereof.

Other objects and advantages of this invention will become apparent from the following description taken in connection with the accompanying drawings wherein are set forth, by way of illustration and example, certain embodiments of this invention.

SUMMARY OF THE INVENTION

A one-piece mounting bracket is provided for pivotally mounting a cultivator tool on a tool bar and for supporting biasing means for urging the tool into ground engagement. The bracket is channel shaped and comprises a web, a pair of flanges projecting outwardly from opposite sides of the web, a connection lug projecting from the web in the opposite direction from the flanges for connecting the bracket to the biasing means, and stop means for limiting the pivotal rotation of the tool with respect to the bracket. Each flange has a cutout formed medially along the free edge thereof opposite the web for snugly receiving the tool bar. A U-bolt wraps around the tool bar and is fastened to the bracket by fastening means thereby securing the tool bar to the bracket and forming a strong and stable interconnection therebetween. A planar blank is formed by a process including the steps of bending and folding the blank into the strong and durable bracket.

The drawings constitute a part of the specification and include exemplary embodiments of the present invention and illustrate various objects and features thereof.

BRIEF DESCRIPTION OF THE DRAWINGS

FIG. 1 is a side elevational view of a mounting apparatus for pivotally connecting an agriculture tool to a tool bar, the apparatus comprising a tool holder member, an extension spring, and a support bracket embodying the present invention.

FIG. 2 is a rear elevational view of the mounting apparatus.

FIG. 3 is an enlarged side elevational view of the mounting apparatus with portions broken away to illustrate detail thereof.

FIG. 4 is an enlarged partial side view of the mounting apparatus with portions thereof broken away and with the tool holding member in an alternative rotated position as compared to FIG. 3.

FIG. 5 is a cross sectional view of the mounting apparatus taken along line 5—5 of FIG. 4.

FIG. 6 is a rear elevational view of a blank before forming into the support bracket.

FIG. 7 is an enlarged perspective view of the support bracket.

DETAILED DESCRIPTION OF THE PREFERRED EMBODIMENT

As required, detailed embodiments of the present invention are disclosed herein; however, it is to be understood that the disclosed embodiments are merely exemplary of the invention which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

As illustrated in FIG. 1, the reference numeral 1 generally designates a mounting apparatus for pivotally connecting an agricultural or cultivator tool 3 having a shank 4 and a soil working tooth 5 to a mobile agricultural frame member or tool bar 6. The mounting apparatus 1 comprises a support bracket 7 which embodies the present invention, a U-bolt 8, a tool holder member 9 and biasing means 10.

For purposes of description herein the terms "front" and "forward" refer to the left as seen in FIG. 1. The terms "upper", "lower", "right", "left", "rear", "vertical", "horizontal", and derivatives thereof shall relate to the invention as oriented in FIGS. 1 through 4, however, it is to be understood that the invention may assume various alternative orientations, except where expressively specified to the contrary.

The mounting apparatus 1 is secured to the tool bar 6 by means of the U-bolt 8 which fits snugly about the rear, top and bottom sides thereof and which is fastened to the support bracket 7 in a manner which will be described hereinafter. The illustrated biasing means 10 comprises an extension spring 11 and includes an upper connection portion 13 which attaches the spring 11 to an upper portion of the support bracket 7 by means which will also be described hereinafter. A lower end of the spring 11 is pivotally attached by a connector member 14 to one end of the tool holder member 9. The connector member 14, as seen in FIG. 3, comprises a sleeve 15 having external bearing surfaces 16 on opposite ends thereof which thrust respectively against a pair of lips 17 on the tool holder member 9. A pivot pin 18 extends through the tool holder member 9 and through a bore 19 in the center of a connector 15, thus allowing the tool holder member 9, and consequently the tool shank 4 to rotate about a horizontal transverse axis of the pivot pin 18, with respect to the spring 11. A threaded lug 20 extends upwardly from the connector member 15 and is fixedly attached to the spring 11 by winding the coils of the spring 11 thereabout.

The tool holder member 9 comprises an elongate channel-shaped structure having a substantially flat web or back portion 22 and downwardly extending side wall portions 23 and 24 on opposite sides of the back portion 22. Rearward sections of the side wall portions 23 and 24 are turned inwardly to form lips 25 and 26 respectively, which in conjunction with the side wall portions 23 and 24 and back portion 22 encircle or wrap around the shank 4 of the agricultural tool 3, such that the shank 4 cannot move transversely relative to the tool holder member 9. A suitable fastener such as bolt 27, is passed through an aperture 28 in the tool holder member 9 and an aperture 29 in the shank 4 and secured therein by a nut 30 so as to prevent traverse movement of the tool shank 4 with respect to the tool holder member 9. A front end of the tool holder member back portion 22 is removed or cut out so as to allow pivotal movement of the connector member 15 while retaining sufficient structural material on each side thereof to constitute the lips 17 on which the bearing surfaces 16 pivot respectively. Pivotal connection between support bracket 7 and the tool holder member 9 is provided by a sleeve 31 fixedly attached by welding or the like to the upper surface of the tool holder member back portion 22 and having therein a coaxial bushing 32 and an inner coaxial pivot pin 33 which is connected to the support bracket 7 by means which will be described hereinafter. The pivotal interconnection between the tool holder member 9 and the support bracket 7 is spaced from the pivotal interconnection of the tool holder member 9 with the spring 11, the axis of both pivot pins 18 and 33 being parallel. The spring 11 resiliently thrusts upwardly against a frontward portion of the tool holder member 9 which tool holder member 9 pivots about the interconnection thereof with the support brackets 7, thus producing a lever effect and urging the soil tool 5 downwardly into the ground.

The support bracket 7, as is best illustrated in FIG. 7, is a substantially channel shaped structure having a vertically oriented substantially flat backplate or web 40 and a pair of vertically extending flanges 41 and 42 projecting outwardly from the sides of the web 40. The flanges 41 and 42 are rearwardly projecting and are substantially coextensive. The flanges 41 and 42 are slightly canted near the tops thereof toward each other.

A connection lug 43 projects from an upper end of the support bracket 7. The connection lug 43 is channel shaped comprising a substantially flat web portion 44 having flange portions 45 and 46 projecting upwardly from each side thereof. The web portion 44, flange portions 45, and flange portion 46 are essentially extensions of the web 40 and flanges 41 and 42 respectively bent at an angle with respect thereto, while maintaining the channel integrity thereof. Preferably the web portion 44 forms an angle with respect to the web 40 such that the latter is almost perpendicular to the former and such that the connection lug 43 extends forwardly of the remainder of the support bracket 7. An aperture 47 is laterally centered in the connection lug web portion 44 and receives the spring upper end 13 therethrough. The spring 11 is secured to the connection lug 43 by a suitable fastener, such as a nut 48 (see FIG. 3).

Projecting from a lower end of the web 40 and extending rearwardly therefrom is stop means or tab 51. The tab 51 forms an obtuse angle with web 40 and a portion thereof extends between the flanges 41 and 42 abutting therewith along edges 52 and 53. In the illustrated embodiment, the tab 51 forms an angle in the nature of 115° with respect to the web 40. A frontward surface 54 of the tab 51 engages a head 55 of the bolt 27 on the tool holder member 9 when the agricultural tool 3 has been biased or urged into a maximum downward position relative to the support bracket 7. FIG. 3 shows the tool holder positioned in an attitude such that the tool 3 is in a maximum downward position, and the bolt head 55 is thrusting against the tab 51, thereby preventing further downward movement of the tool 3 relative to the mounting apparatus 1. FIG. 4 illustrates the relative location of the tab 51 and tool holder member 9 at such a time when the tool 3 is not in a maximum downward position and wherein the spring 11 is urging the tool 3 to the position illustrated in FIG. 3.

The flanges 41 and 42 and the web 40 to a lesser extent are tapered from the bottom end thereof to the upper end thereof, thus providing greater strength at the lower end of the support bracket 7. Each of the flanges 41 and 42 has a respective cutout 58 and 59 formed medially along the peripheral rearward edge thereof. The cutouts 58 and 59 are coextensive, are substantially parallel, and are horizontally spaced. Each of the cutouts 58 and 59 are shaped so as to snugly receive a front portion of the tool bar 6 therein. In addition, a front edge 60 and 61 of each cutout 58 and 59 respectively, is preferably parallel to the web 40. The flanges 41 and 42 extend below the web 40 forming ears 62 and 63 respectively. Each of the ears 62 and 63 form slight angles with respect to the flange associated therewith such that the ears 62 and 63 are parallel. A bottom edge 64 and 65 of each of the ears 62 and 63 respectively is slanted downwardly from the front to a medial portion thereof, thereafter same curve upwardly to meet the rear edges of the flanges 41 and 42 respectively. Located in each of the ears 62 and 63 are apertures 66 and 67 respectively. The apertures 66 and 67 are coaxial and constitute pivotal connection means between the support bracket 7 and tool holder member 9. The apertures 66 and 67 receive the pivot pin 33 therein such that the tool holder member 9 pivots about a horizontal axis of the pivot pin 33 in a vertical traverse plane on the support bracket 7 except that such pivoting is limited by the stop means or tab 51.

Laterally centered and vertically spaced upon the web 40 are a pair of apertures 70 and 71. The apertures 70 and 71 are positioned so as to receive the ends of the top and bottom portion of the U-bolt 8 therein. When the U-bolt 8 is positioned around the tool bar 6, as illustrated in FIG. 3, the apertures 70 and 71 provide fastener receiver means for securing the mounting apparatus 1 to the tool bar 6. Each end of the U-bolt 8 is secured to the mounting bracket by a suitable fastener such as nuts 74 and 75 respectively, on the forward side of the web 40. In this manner the nuts 74 and 75 are easily accessible whenever it is desirable to secure the mounting apparatus 1 to the tool bar 6 or remove same therefrom, since neither the flanges 41 and 42 nor the tool bar 6, which are positioned on the rearward side of the web 40, hamper access thereto.

The forward wall 6' of the tool bar 6, the support bracket web 40 and the flanges 41 and 42 define therebetween a substantially rectangular structure which provides greater strength than if the tool bar 6 rested directly upon the web 40. In addition, the tab 51 maintains the separation between the flanges 41 and 42, thereby adding additional strength to the construction.

As is best illustrated in FIG. 6, the support bracket 7 is a single one-piece structure formed from a planar blank 80, illustrated in FIG. 6, having substantially uniform thickness and preferably being formed by stamping from sheet metal stock. The blank 80 has an elongated central web portion 81 which is divided into a medial part or segment 82, an upper end or segment 83, and a lower end or segment 84. Extending outwardly from the web portion 81 are flange portions 86 and 87. Rectangularly shaped cutout portions 89 and 90 are included along the outer edge of the flange portions 86 and 87 respectively. Circular apertures 91 and 92 are positioned near the bottom of each of the flanges 86 and 87 respectively. Laterally centered and vertically spaced apertures 93 and 94 are positioned along the web portion medial segment 82. Another circular aperture 95 is centered in the web portion upper segment 83.

The blank 80 is formed into the support bracket 7 by folding or braking the flange portions 86 and 87 into substantially perpendicular relationship to the web portion 81 along fold lines 97 and 98 respectively. The web portion upper segment 83 along with attached flange portion medial segment 82 are folded along line 99, preferably at an angle near to 90 degrees with respect to the web portion medial segment 82 in a direction opposite the direction in which the flange portions 86 and 87 were folded. The material of construction of the blank 80 must be malleable enough to prevent breakage or fracture during such bending. The web portion lower segment 84 is also bent with respect to the web portion medial segment 81 in the same direction in which the flange portions 86 and 87 were bent along fold line 100, preferably in the nature of about 115° relative to the web portion medial segment 82. The lower ends 101 and 102 of the flange portions 86 and 87 respectively are bent slightly with respect to the remainder of the flange portions 86 and 87 so as to be parallel with each other. The web portion lower segment 84 extends between the flange portions 86 and 87 after folding and bending respectively. The channel integrity of the web portion 81 and folded flange portions 86 and 87 is maintained throughout the production of the support bracket 7. After all steps are completed, the flange portions 86 and 87 comprise support flanges 41 and 42, the web portion medial segment 82 becomes the support bracket web 40, the web portion upper segment 83 along with attached flange portions becomes the support bracket connection lug 43, and the web portion lower segment 84 becomes the support bracket tab 51.

In use the mounting apparatus 1 is utilized to attach the agricultural or cultivator tool 3 to the mobile farm equipment frame member or tool bar 6, as illustrated in FIG. 1. The support bracket 7 provides exceptionally stable support to the mounting apparatus 1 even though same is attached to the tool bar 6 by a single U-bolt 8. As is also illustrated in FIG. 1 in phantom and solid line views, the agricultural tool 3 pivots relative to the support bracket 7 on the pivot pin 33, such that the tooth 5 can rise above obstructions such as rocks, etc. The spring 11 maintains a constant force upon the end of the tool holder member 9 so as to lever and urge the tooth 5 into a predetermined depth in the soil which is being cultivated thereby. The position of the stop tab 51 and bolt head 55 determine the maximum depth which the soil tooth 5 may achieve relative to the mounting apparatus 1. This maximum depth may be adjusted by shimming the bolt 27 so as to raise the head 55 or by changing the angle on the stop tab 51.

It is to be understood that while certain embodiments of the present invention have been illustrated and described herein, it is not to be limited to the specific forms or arrangement of parts herein described and shown.

What is claimed and desired to secure by Letters Patent is:

1. A one-piece mounting bracket for pivotally mounting a cultivator tool on a tool bar and for supporting a spring for biasing said tool into ground engagement; said bracket comprising:
   (a) a channel-shaped upright bracket member having a substantially vertically oriented web and a pair of vertically extending and outwardly projecting side flanges extending the length of said web;
   (b) said bracket member having an upper connection lug for connecting the spring thereto; said connection lug projecting at an angle to the plane of said web and extending outwardly from said web in a direction opposite said side flanges; said side flanges extending continuously from said vertical web into upwardly projecting flanges along each side edge of said lug;
   (c) a cutout formed in an edge portion of each of said flanges; the cutouts being substantially coextensive; the cutouts adapted for cooperatively receiving a tool bar snugly therein;
   (d) a fastener receiving means in said web for receiving a fastener for attaching said bracket member to said tool bar;
   (e) pivotal connection means on a lower end of said bracket member for pivotally connecting a shank of said cultivator tool thereto; and
   (f) stop means on a lower end of said bracket member for limiting the pivotal motion of said cultivator tool relative to said bracket member.

2. The bracket according to claim 1 wherein:
   (a) said lug is substantially perpendicular with respect to said web.

3. The bracket according to claim 1 wherein:
   (a) said stop means comprises a flat stop member extending downwardly from and being angled in the direction of said flanges with respect to said web and being continuous therewith; a portion of said stop member extending between said flanges and providing structural support thereto.

4. The bracket according to claim 3 wherein:
   (a) inner edges of each of said slots are parallel with said web and said tool bar is substantially rectangular in cross-section, one side of said tool bar engaging each of the inner edges of said slots; said tool bar and said bracket member forming a relatively strong rectangular construction therebetween, said construction being further strengthened by the support provided to said flanges by said stop member.

5. A one-piece upright member for supporting a spring operatively connected to a shank of a cultivator tool and for pivotally supporting the shank, said upright member adapted for mounting said spring and said tool on a transverse agricultural tool bar, said upright member comprising:

(a) a transversely oriented web having a generally vertically oriented medial segment and an upper segment;

(b) said upper segment of said web projecting forwardly in the direction of normal motion of said tool bar;

(c) a pair of vertically oriented flanges extending continuously along the side edges of said web medial segment and upper segment, said flanges projecting rearwardly from said web medial segment and upwardly from said web upper segment;

(d) a cutout in each of said flanges positioned intermediately along a respective rear periphery thereof, each of said cutouts being sized and aligned for snugly receiving a portion of said tool bar therein;

(e) aperture means formed in said web medial segment to receive a fastener means for connecting said upright member to said tool bar;

(f) means for connecting said web upper segment to an upper end of said spring; and (g) a tab attached to a lower edge of said web medial segment and being folded rearwardly with respect to said web medial segment; said tab defining a stop for engagement by means on said shank to limit rotation of said tool so as to limit depth thereof into the ground.

6. The member according to claim 5 wherein:
(a) said stop tab extends between and maintains spacing of said flanges.

7. The member according to claim 6 including:
(a) a pair of coaxially aligned apertures positioned respectively near the lower ends of said flanges, said aligned apertures receiving means for pivotally connecting said cultivator tool shank thereto.

* * * * *